(«12») United States Patent
Shike

(10) Patent No.: US 11,131,576 B2
(45) Date of Patent: Sep. 28, 2021

(54) WORK VEHICLE, SERVER DEVICE, LOAD WEIGHT MANAGEMENT SYSTEM, AND LOAD WEIGHT MANAGEMENT METHOD

(71) Applicant: Komatsu Ltd., Tokyo (JP)

(72) Inventor: Chikashi Shike, Tokyo (JP)

(73) Assignee: Komatsu Ltd., Tokyo (JP)

( * ) Notice: Subject to any disclaimer, the term of this patent is extended or adjusted under 35 U.S.C. 154(b) by 7 days.

(21) Appl. No.: 16/339,084

(22) PCT Filed: Dec. 26, 2017

(86) PCT No.: PCT/JP2017/046807
§ 371 (c)(1),
(2) Date: Apr. 3, 2019

(87) PCT Pub. No.: WO2018/124144
PCT Pub. Date: Jul. 5, 2018

(65) Prior Publication Data
US 2020/0041329 A1    Feb. 6, 2020

(30) Foreign Application Priority Data
Dec. 28, 2016  (JP) .............................. JP2016-256376

(51) Int. Cl.
*G01G 19/02*       (2006.01)
*B60P 1/04*        (2006.01)
(Continued)

(52) U.S. Cl.
CPC ................ *G01G 19/02* (2013.01); *B60P 1/04* (2013.01); *E02F 9/20* (2013.01); *E02F 9/26* (2013.01); *G01G 19/18* (2013.01); *G01G 23/36* (2013.01)

(58) Field of Classification Search
CPC ....................................................... G01G 19/02
See application file for complete search history.

(56) References Cited

U.S. PATENT DOCUMENTS 4,605,081 A  *  8/1986  Helmly, Jr. ............ G01G 19/02
                                                    177/1
8,589,035 B2 * 11/2013  Adolfson ............... B60K 28/08
                                                    701/50
(Continued)

FOREIGN PATENT DOCUMENTS

JP       04-059572 B     9/1992
JP       09-178541 A     7/1997
(Continued)

*Primary Examiner* — Michael A Berns
(74) *Attorney, Agent, or Firm* — Locke Lord LLP

(57) ABSTRACT

A work vehicle includes a working device which is configured to excavate and unload soil, a load meter which is configured to measure weight of the soil loaded by the working device, a transport vehicle specifier which is configured to specify a transport vehicle to be loaded with the soil, a vehicle weight acquirer which is configured to acquire vehicle weight information on loadable weight of the transport vehicle, a load weight calculator which calculates load weight of the soil loaded on the transport vehicle, according to the weight measured by the load meter, and an output unit which is configured to output information on a remaining loading capacity of the transport vehicle obtained from the vehicle weight information and the load weight.

20 Claims, 7 Drawing Sheets

(51) Int. Cl.
*E02F 9/20* (2006.01)
*E02F 9/26* (2006.01)
*G01G 19/18* (2006.01)
*G01G 23/36* (2006.01)

(56) References Cited

U.S. PATENT DOCUMENTS

| | | | |
|---|---|---|---|
| 9,508,053 B2* | 11/2016 | Collins | G06Q 10/083 |
| 10,155,653 B2* | 12/2018 | Tojima | B67D 7/348 |
| 10,597,852 B2* | 3/2020 | Hori | E02F 9/26 |
| 2011/0066336 A1 | 3/2011 | Adolfson | |
| 2014/0012404 A1* | 1/2014 | Taylor | G06F 30/13 |
| | | | 700/97 |
| 2020/0041329 A1* | 2/2020 | Shike | B60P 1/04 |

FOREIGN PATENT DOCUMENTS

| | | |
|---|---|---|
| JP | 10-109584 A | 4/1998 |
| JP | 2007-155410 A | 6/2007 |
| JP | 2008-114974 A | 5/2008 |
| JP | 2012-035973 A | 2/2012 |
| JP | 2015-141092 A | 8/2015 |

* cited by examiner

WORK VEHICLE, SERVER DEVICE, LOAD WEIGHT MANAGEMENT SYSTEM, AND LOAD WEIGHT MANAGEMENT METHOD

TECHNICAL FIELD

The present invention relates to a work vehicle, a server device, a load weight management system, and a load weight management method.

Priority is claimed on Japanese Patent Application No. 2016-256376, filed on Dec. 28, 2016, the content of which is incorporated herein by reference.

BACKGROUND ART

Patent Document 1 discloses a loading management system having a truck scale which measures weight of a dump truck. Therefore, an operator can check whether or not overloading on the dump truck occurs.

CITATION LIST

Patent Literature

[Patent Document 1] Japanese Unexamined Patent Application, First Publication No. 2008-114974

SUMMARY OF INVENTION

Technical Problem

According to the system disclosed in Patent Document 1, when an aggregate is transported out by the dump truck, weight thereof is measured. Therefore, in a case where the overloading on the dump truck is found from a measurement result of the truck scale, the operator needs to unload the aggregate from the dump truck and measure the weight again. That is, in the system disclosed in Patent Document 1, the overloading is found after loads are loaded, and thus, there is a possibility that it takes a trouble of unloading the loads.

In addition, the dump truck has a maximum loading capacity determined in advance. However, there is a possibility that options such as electrical components are provided according to the dump truck, and thus, it is difficult to accurately recognize information such as a remaining loading capacity of each dump truck. Therefore, taking into consideration a risk of overloading or a risk of returning to unload the loads in a case of the overloading, the loads are loaded such that extra margins for the maximum loading capacity remain, and thus, it is difficult to improve transport efficiency.

An object of an aspect of the present invention is to provide a work vehicle, a server device, a load weight management system, and a load weight management method capable of recognizing information on a remaining loading capacity when loading is performed on a transport vehicle such as a dump truck.

Solution to Problem

According to a first aspect of the present invention, there is provided a work vehicle including: a working device which is configured to excavate and unload soil, a load meter which is configured to measure weight of the soil loaded by the working device, a transport vehicle specifier which is configured to specify a transport vehicle to be loaded with the soil, and an output unit which is configured to output vehicle weight information on loadable weight of the transport vehicle and information on a remaining loading capacity of the transport vehicle obtained from the weight measured by the load meter.

Advantageous Effects of Invention

According to the above aspect, it is possible to recognize information on a remaining loading capacity when loading is performed on a transport vehicle such as a dump truck.

DESCRIPTION OF EMBODIMENTS

First Embodiment

<<Load Weight Management System>>

Figure 1:
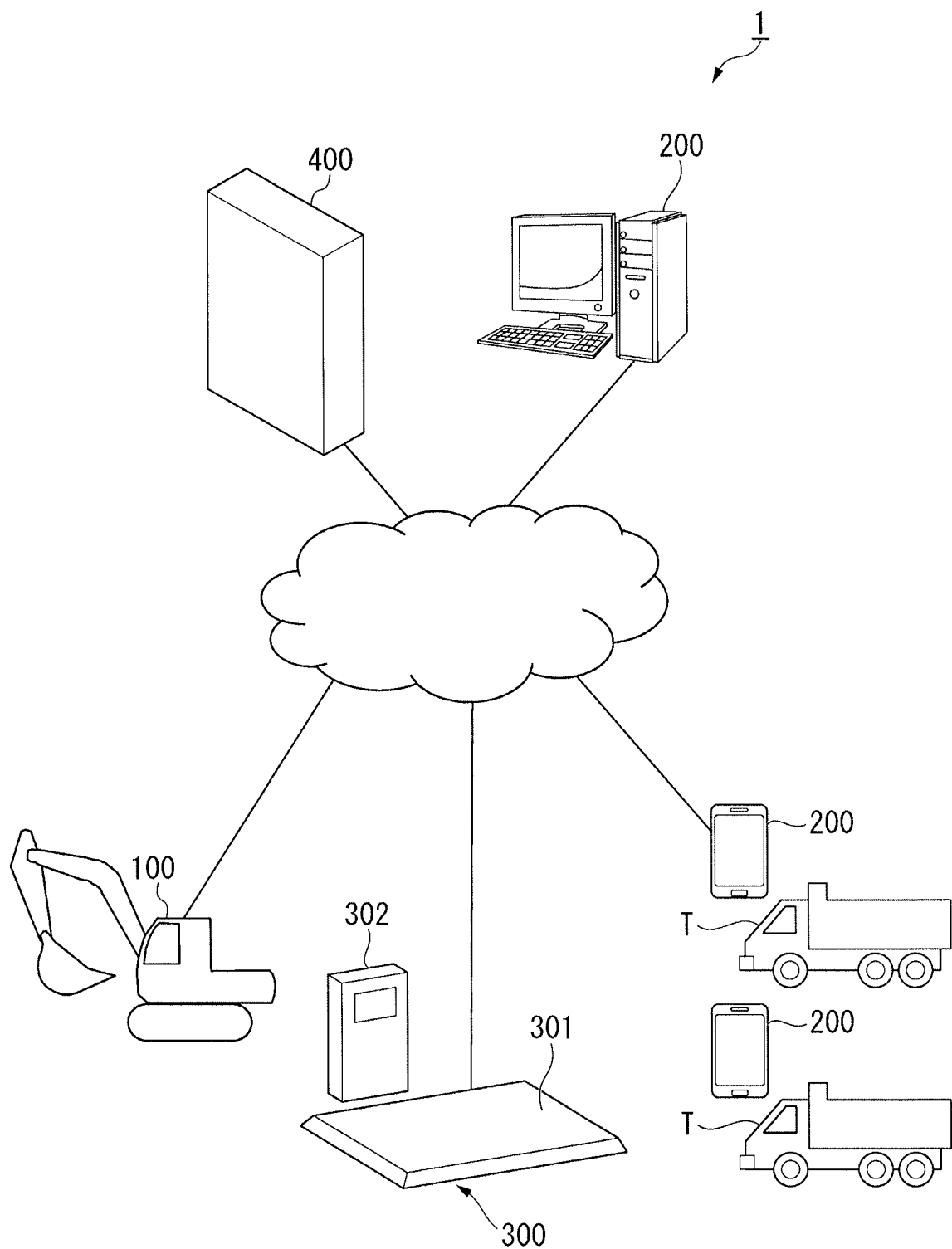
FIG. 1 is a schematic diagram showing a configuration of a load weight management system according to a first embodiment.

FIG. 1 is a schematic diagram showing a configuration of a load weight management system according to a first embodiment.

A load weight management system 1 manages weight of soil loaded on a transport vehicle T at a loading site of the soil.

The load weight management system 1 includes at least one work vehicle 100, at least one communication terminal 200, a truck scale 300 (vehicle weight meter), and a server device 400. The communication terminal 200 is provided in the transport vehicle T which becomes an object to be managed by at least the load weight management system 1. The communication terminal 200 provided in the transport vehicle T may be installed inside the transport vehicle T. The communication terminal 200 provided in the transport vehicle T may be owned or used by an operator of the transport vehicle T. In addition, the communication terminal 200 may be provided in an office away from the work vehicle 100 or a construction site. For example, as the communication terminal 200, a mobile phone, a smart phone, a portable computer, an in-vehicle computer, a personal computer, or the like can be used.

The work vehicle 100 is a vehicle which is operated at the loading site of the soil and performs an embankment work or an excavation work. An example of the work vehicle 100 includes a hydraulic excavator, a bulldozer, a wheel loader, or the like. The transport vehicle T is a vehicle which travels between a loading site and an unloading site so as to carry the soil from the loading site to the unloading site. An example of the transport vehicle T includes a dump truck or the like. The loading site and the unloading site are examples of the construction site. A plurality of transport vehicles T or one transport vehicle T can exist at the same time at one loading site.

<<Work Vehicle>>

Figure 2:
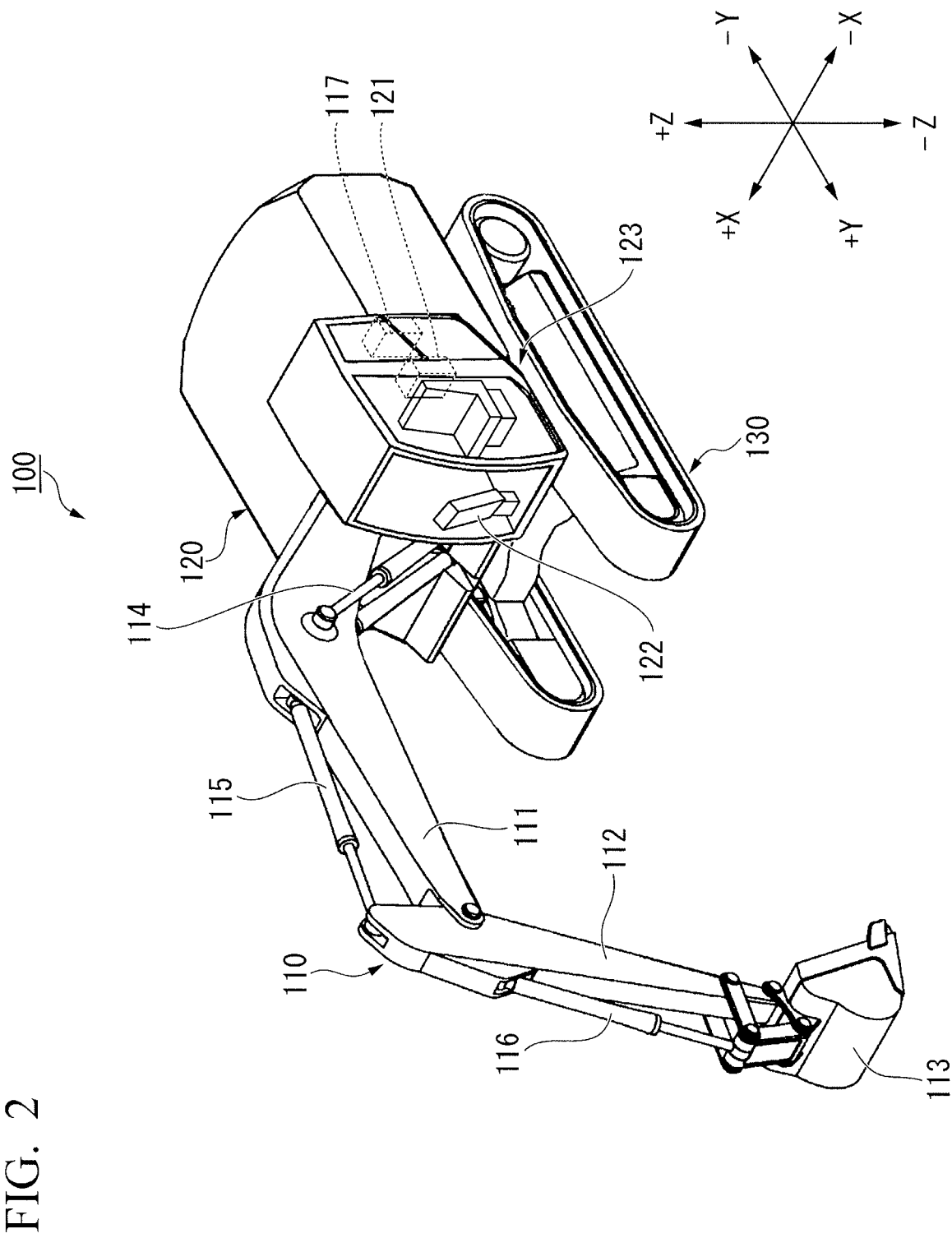
FIG. 2 is a perspective view showing a configuration of a work vehicle according to the first embodiment.

FIG. 2 is a perspective view showing a configuration of the work vehicle according to the first embodiment.

The work vehicle 100 includes a working device 110 which is operated by a hydraulic pressure, a vehicle body 120 serving as an upper turning body which supports the working device 110, and a traveling device 130 serving as a lower traveling body that supports the vehicle body 120.

The working device 110 includes a boom 111, an arm 112, a bucket 113, a boom cylinder 114, an arm cylinder 115, a bucket cylinder 116, and a payload meter 117 (load meter). The working device 110 can excavate the soil and unload the soil. The boom 111 is a column which supports the arm 112 and the bucket 113. A proximal end portion of the boom 111 is attached to a front portion of the vehicle body 120 via a pin.

The arm 112 is connected to the boom 111 and the bucket 113. A proximal end portion of the arm 112 is attached to a distal end portion of the boom 111 via a pin.

The bucket 113 is a container having a blade for excavating the soil or the like. A proximal end portion of the bucket 113 is attached to the distal end portion of the arm 112 via a pin.

The boom cylinder 114 is a hydraulic cylinder for operating the boom 111. A proximal end portion of the boom cylinder 114 is attached to the vehicle body 120. A distal end portion of the boom cylinder 114 is attached to the boom 111.

The arm cylinder 115 is a hydraulic cylinder for driving the arm 112. A proximal end portion of the arm cylinder 115 is attached to the boom 111. A distal end portion of the arm cylinder 115 is attached to the arm 112.

The bucket cylinder 116 is a hydraulic cylinder for driving the bucket 113. A proximal end portion of the bucket cylinder 116 is attached to the arm 112. A distal end portion of the bucket cylinder 116 is attached to the bucket 113.

The payload meter 117 measures the weight of the soil lifted by the working device 110. For example, the payload meter 117 includes a pressure sensor which measures a pressure applied to the boom cylinder 114 and converts a magnitude of the pressure measured by the pressure sensor into the weight of the soil. In addition, a payload meter 117 according to another embodiment may measure the weight of the soil according to the pressure applied to the arm cylinder 115 or the bucket cylinder 116.

The vehicle body 120 includes a control device 121 which manages the weight of the soil loaded by the working device 110 and an input/output device 122 which is an interface between a user and the control device 121. The control device 121 transmits the weight of the soil measured by the payload meter 117 to the server device 400 and displays a remaining load weight in the transport vehicle T on the input/output device 122. The input/output device 122 is provided in a cab 123 of the vehicle body 120. The cab 123 is installed on a front side (+Y direction) of the vehicle body 120 and a left side (−X side) of the working device 110. The input/output device 122 includes an input device such as a Liquid Crystal Display (LCD) and an output device such as a touch pad or a keyboard. As the input/output device 122, a touch panel can be used.

<<Control Device of Work Vehicle>>

Figure 3:
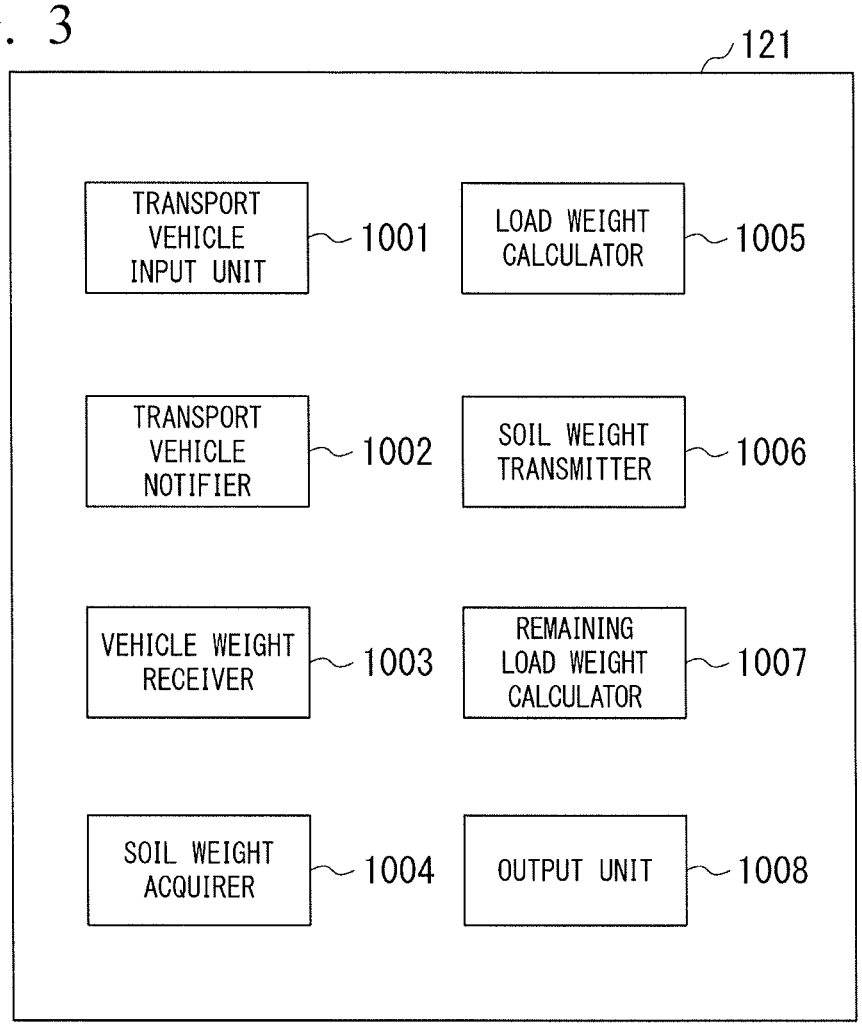
FIG. 3 is a block diagram showing a configuration of a control device of the work vehicle according to the first embodiment.

FIG. 3 is a block diagram showing a configuration of the control device of the work vehicle according to the first embodiment. The control device 121 includes a transport vehicle input unit 1001, a transport vehicle notifier 1002, a vehicle weight receiver 1003, a soil weight acquirer 1004, a load weight calculator 1005, a soil weight transmitter 1006, a remaining load weight calculator 1007, and an output unit 1008.

The transport vehicle input unit 1001 accepts an input of the transport vehicle ID which is identification information of the transport vehicle T to be loaded with the soil by the work vehicle 100 via the input/output device 122. An example of the transport vehicle ID includes a vehicle number described on the number plate of the transport vehicle T, a number described in the transport vehicle T, any specified identification number, or the like. The transport vehicle input unit 1001 is an example of a transport vehicle specifier which specifies the transport vehicle T to be loaded by soil.

The transport vehicle notifier 1002 notifies the transport vehicle ID input to the transport vehicle input unit 1001 to the server device 400 via the network.

The vehicle weight receiver 1003 receives, from the server device 400, no-loading vehicle total weight in the transport vehicle T to be loaded with the soil measured by the truck scale 300 and allowable vehicle total weight of the transport vehicle T. A combination of the no-loading vehicle total weight measured by the truck scale 300 and the allowable vehicle total weight is an example of weight information on a loadable weight. In addition, in a case where the control device 121 according to another embodiment stores in advance the combination of the no-loading vehicle total weight and the allowable vehicle total weight in association with the transport vehicle ID of the transport vehicle T, the vehicle weight receiver 1003 may receive the identification information of the transport vehicle T to specify the identification information. In addition, the vehicle weight receiver 1003 according to another embodiment may receive the loadable weight from the server device 400. The vehicle weight receiver 1003 is an example of a vehicle weight acquirer which acquires vehicle weight information on the loadable weight of the transport vehicle T.

The soil weight acquirer 1004 acquires soil weight information indicating the weight measured by the payload meter 117 from the payload meter 117.

According to the soil weight information acquired by the soil weight acquirer 1004, the load weight calculator 1005 calculates a load weight which is the weight of soil loaded on the transport vehicle T by the work vehicle 100.

The soil weight transmitter 1006 transmits load weight information indicating the load weight calculated by the load weight calculator 1005 to the server device 400. The soil weight transmitter 1006 is an example of a weight transmitter which transmits the weight information indicating the weight measured by the payload meter 117 to the outside.

The remaining load weight calculator 1007 calculates the remaining load weight of the transport vehicle T, according to the no-loading weight and the allowable vehicle total weight received by the vehicle weight receiver 1003 and the load weight calculated by the load weight calculator 1005.

The output unit 1008 outputs to the input/output device 122 an instruction to display information on the remaining load weight calculated by the remaining load weight calculator 1007. An example of the display of the information on the remaining load weight includes a display of the remaining load weight itself, a comparison display of the vehicle total weight and the vehicle total weight, or the like.

<<Truck Scale>>

As shown in FIG. 1, the truck scale 300 includes a truck scale body 301 and an identification information acquisition device 302.

The truck scale body 301 is installed at an entrance of the loading site. As a result, the truck scale 300 can measure the no-loading vehicle total weight of the transport vehicle T entering the loading site. The identification information acquisition device 302 is a device which acquires the transport vehicle ID which is the identification information of the transport vehicle T. The identification information acquisition device 302 is installed near the truck scale body 301. When the transport vehicle T is on the truck scale body 301, the identification information acquisition device 302 acquires the transport vehicle ID, and thus, the truck scale 300 can specify which of the transport vehicles T the weight measured by the truck scale body 301 corresponds to. An example of a method of acquiring the transport vehicle ID includes a method of acquiring the transport vehicle ID from the communication terminal 200 by short-range wireless communication with the communication terminal 200 provided in the transport vehicle T, a method in which a driver of the transport vehicle T inputs the transport vehicle ID to the identification information acquisition device 302 via an input unit (not shown), a method of causing the identification information acquisition device 302 to read an identifier (a two-dimensional code or the like) representing the transport vehicle ID by the driver of the transport vehicle T, or the like. In addition, in a case where the communication terminal 200 and the truck scale 300 respectively include a position detector for acquiring position information by GNSS, the truck scale 300 may specify a closest communication terminal 200 existing within a predetermined distance from the position of the own device so as to acquire the transport vehicle ID. Moreover, in a case where the truck scale 300 includes an imaging device, the transport vehicle ID may be acquired by extracting the transport vehicle ID from an image captured by the imaging device. The truck scale 300 transmits a combination of the measured weight and the transport vehicle ID to the server device 400 by using a communication device (not shown). Moreover, the truck scale 300 according to another embodiment may transmit other information (position information, images, or the like) acquired from the transport vehicle T to the server device 400, instead of the transport vehicle ID. In this case, the server device 400 specifies the transport vehicle ID according to the information.

<<Server Device>>

Figure 4:
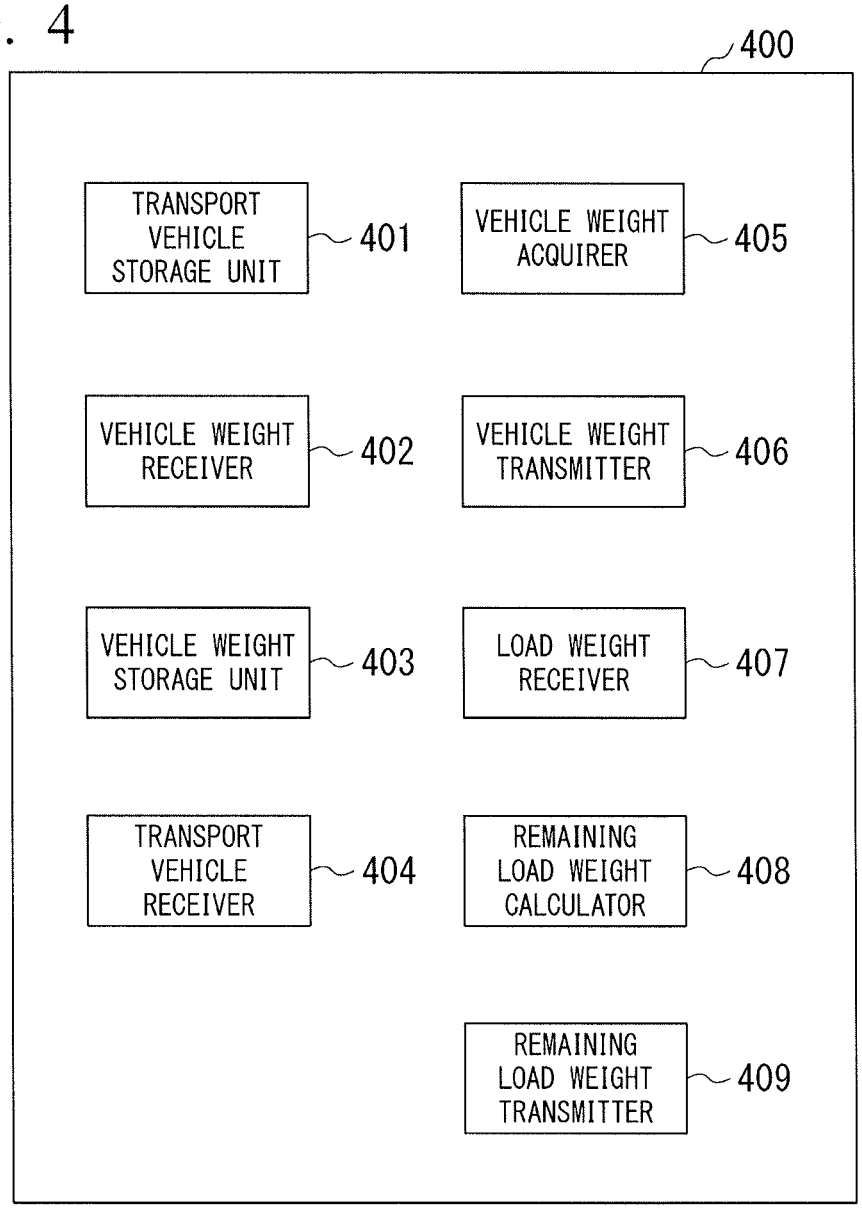
FIG. 4 is a schematic block diagram showing a configuration of a server device according to the first embodiment.

FIG. 4 is a schematic block diagram showing a configuration of the server device according to the first embodiment.

The server device 400 includes a transport vehicle storage unit 401, a vehicle weight receiver 402, a vehicle weight storage unit 403, a transport vehicle receiver 404, a vehicle weight acquirer 405, a vehicle weight transmitter 406, a load weight receiver 407, a remaining load weight calculator 408, a remaining load weight transmitter 409.

The transport vehicle storage unit 401 stores, in association with the transport vehicle ID of the transport vehicle T, a terminal ID which is the identification information of the communication terminal 200 provided in the transport vehicle T and the allowable vehicle total weight of the transport vehicle T. A manager or the like of the load weight management system 1 stores the information of the transport vehicle T in the transport vehicle storage unit 401 in advance. In addition, the terminal ID is referred to when the server device 400 notifies information such as the remaining load weight to the communication terminal 200 provided in the transport vehicle T.

The vehicle weight receiver 402 receives a combination of the transport vehicle ID of the transport vehicle T and the no-loading vehicle total weight, from the truck scale 300. The vehicle weight receiver 402 stores a combination of the received transport vehicle ID and the no-loading vehicle total weight in the vehicle weight storage unit 403.

The vehicle weight storage unit 403 stores the transport vehicle ID and the no-loading vehicle total weight of the transport vehicle T indicated by the transport vehicle ID in association with each other.

The transport vehicle receiver 404 receives the transport vehicle ID from the work vehicle 100. The transport vehicle receiver 404 is an example of a transport vehicle specifier which specifies the transport vehicle T to be loaded with the soil by the work vehicle 100.

The vehicle weight acquirer 405 acquires, from the transport vehicle storage unit 401, the allowable vehicle total weight associated with the transport vehicle ID received by the transport vehicle receiver 404. In addition, the vehicle weight acquirer 405 acquires, from the vehicle weight storage unit 403, the no-loading vehicle total weight associated with the transport vehicle ID received by the transport vehicle receiver 404. That is, the vehicle weight acquirer 405 acquires the vehicle weight information on the loadable weight of the transport vehicle.

The vehicle weight transmitter 406 transmits the allowable vehicle total weight and the no-loading vehicle total weight acquired by the vehicle weight acquirer 405 to the work vehicle 100 which is a transmission source of the transport vehicle ID received by the transport vehicle receiver 404. Accordingly, the work vehicle 100 can receive the allowable vehicle total weight and the no-loading vehicle total weight of the transport vehicle T, by notifying the transport vehicle ID indicating the transport vehicle T to be loaded to the server device 400. In addition, the vehicle weight transmitter 406 according to another embodiment calculates the loadable weight from the allowable vehicle total weight and the no-loading vehicle total weight, and may store the loadable weight in the vehicle weight storage unit 403 or transmit the loadable weight to the work vehicle 100.

The load weight receiver 407 receives load weight information indicating the load weight of the soil each time the work vehicle 100 loads the soil on the transport vehicle T. The load weight receiver 407 is an example of a load weight acquirer which acquires the load weight of the soil loaded on the transport vehicle T by the work vehicle 100.

The remaining load weight calculator 408 calculates the remaining load weight of the transport vehicle T, according to the allowable vehicle total weight and the no-loading vehicle total weight acquired by the vehicle weight acquirer 405, and the load weight information received by the load weight receiver 407.

The remaining load weight transmitter 409 transmits the information on the remaining load weight calculated by the remaining load weight calculator 408 to the communication terminal 200. The remaining load weight transmitter 409 is an example of an output unit which outputs the information on the remaining load weight.

<<Operation of Load Weight Management System>>

Hereinafter, an operation of the load weight management system 1 according to the first embodiment will be described.

Figure 5:
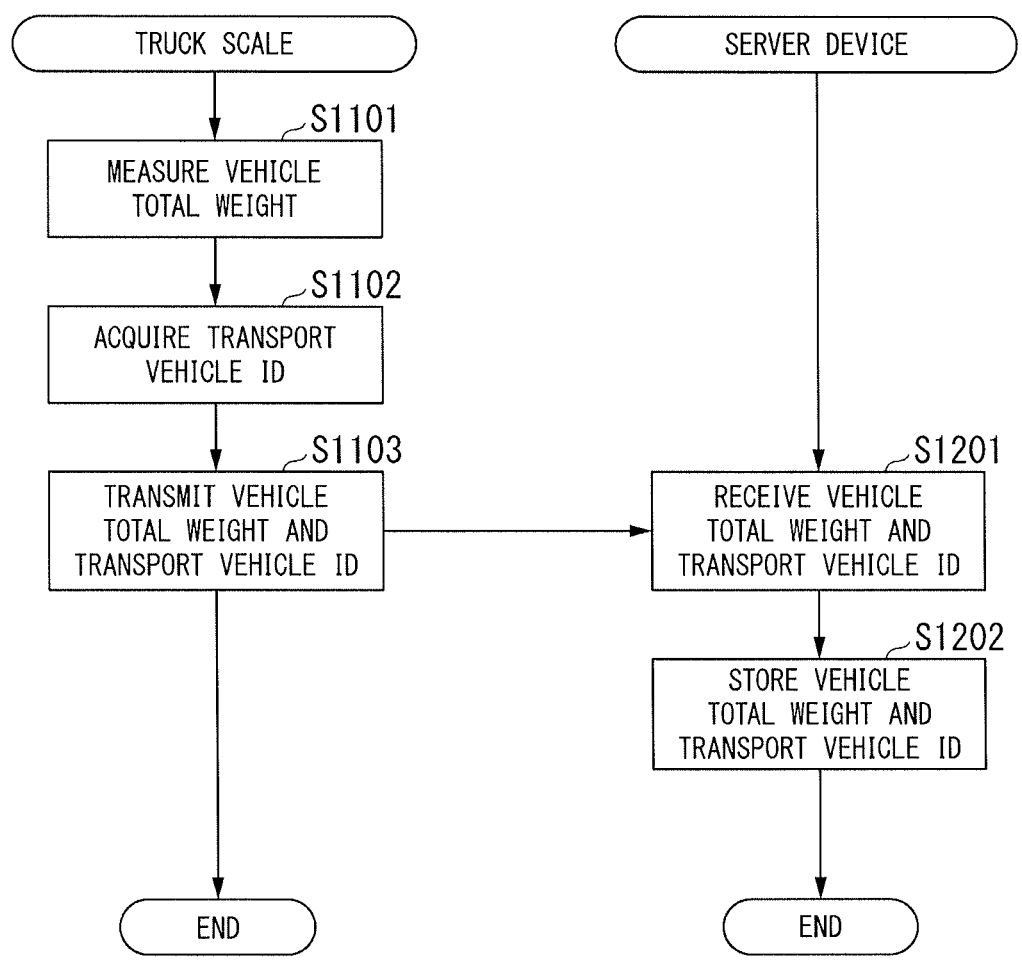
FIG. 5 is a sequence diagram showing an operation of the load weight management system according to the first embodiment when a transport vehicle enters a loading site.

FIG. 5 is a sequence diagram showing an operation of the load weight management system according to the first embodiment when the transport vehicle enters the loading site.

If the transport vehicle T enters the loading site, the transport vehicle T is on the truck scale 300 which is provided at the entrance. Accordingly, the truck scale body 301 measures the vehicle total weight of the transport vehicle T (Step S1101). This case is immediately after the transport vehicle T has entered the loading site, and thus, the soil is not loaded in a vessel. According, the truck scale body 301 can measure the no-loading vehicle total weight of the transport vehicle T. Subsequently, the identification information acquisition device 302 acquires the transport vehicle ID from the transport vehicle T (Step S1102).

The truck scale 300 associates the acquired transport vehicle ID and vehicle total weight with each other, and transmits the association to the server device 400 (Step S1103).

The vehicle weight receiver 402 of the server device 400 receives the transport vehicle ID and the vehicle total weight from the truck scale 300 (Step S1201). The vehicle weight receiver 402 stores the received transport vehicle ID and vehicle total weight in the vehicle weight storage unit 403 (Step S1202).

Figure 6:
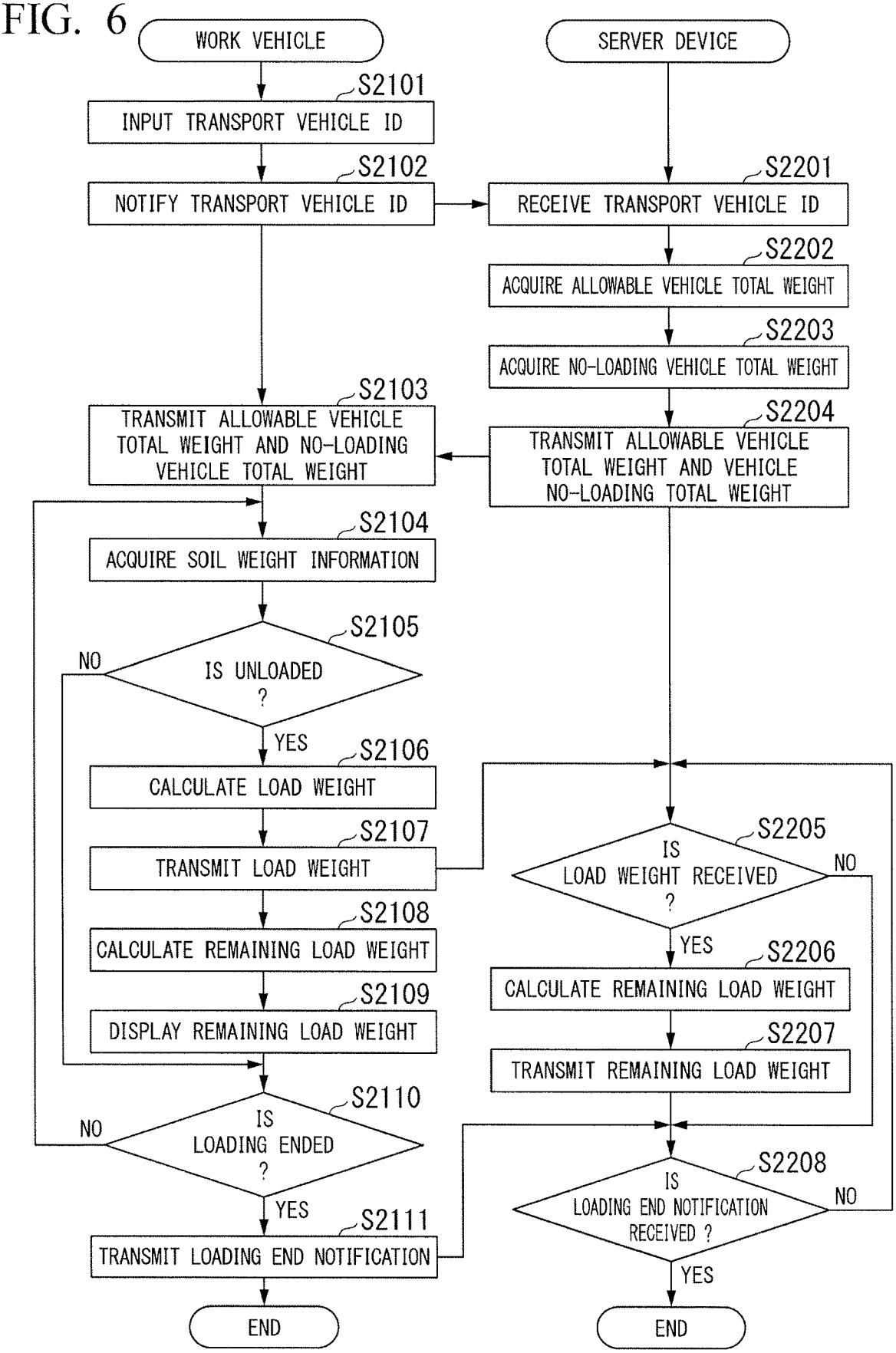
FIG. 6 is a sequence diagram showing an operation of the load weight management system according to the first embodiment when the work vehicle loads soil on the transport vehicle.

FIG. 6 is a sequence diagram showing an operation of the load weight management system according to the first embodiment when the work vehicle loads the soil on the transport vehicle.

Figure 7:
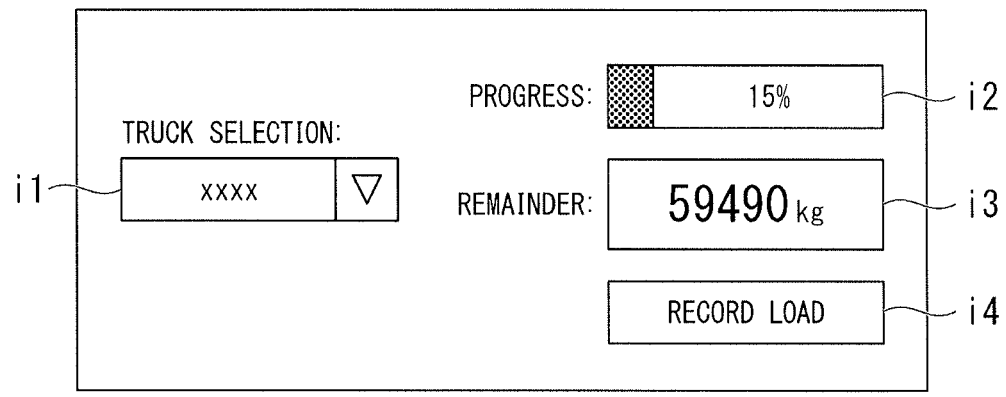
FIG. 7 is a diagram showing an example of information displayed on an input/output device.

FIG. 7 is a diagram showing an example of information displayed on the input/output device.

If the transport vehicle T arrives at a loading location of the loading site, the driver of the work vehicle 100 inputs the transport vehicle ID of the transport vehicle T to the control device 121 via the input/output device 122. Accordingly, the transport vehicle input unit 1001 accepts the input of the transport vehicle ID from the input/output device 122 (Step S2101).

An ID list i1 which selectively holds one transport vehicle ID from a plurality of transport vehicle IDs, a progress bar i2 which displays a progress status of the loading, a capacity label i3 which displays a remaining loadable capacity, and a recording button i4 which accepts an input of an end of loading processing are displayed on the input/output device 122. In addition, the control device 121 receives the plurality of transport vehicle IDs stored in the transport vehicle storage unit 401 from the server device 400 in advance and stores the transport vehicle IDs in a storage unit (not shown). In the ID list i1, a list of transport vehicle IDs stored in a storage unit (not shown) is displayed. That is, the transport vehicle input unit 1001 accepts the input of the transport vehicle ID selected in the ID list i1. Moreover, until the control device 121 receives the vehicle weight information from the server device 400, a value is not displayed on the progress bar i2 and the capacity label i3, or the progress bar i2 and the capacity label i3 themselves are not displayed. In addition, in a case where the control device 121 stores a past load weight history, the input/output device 122 may display the load weight history.

Next, the transport vehicle notifier 1002 notifies the input transport vehicle ID to the server device (Step S2102). The notification includes a work vehicle ID which is the identification information of the work vehicle 100. An example of the work vehicle ID is an IP address or the like.

The transport vehicle receiver 404 of the server device 400 receives the transport vehicle ID from the work vehicle 100 (Step S2201). The vehicle weight acquirer 405 acquires the allowable vehicle total weight associated with the transport vehicle ID received by the transport vehicle receiver 404, from the transport vehicle storage unit 401 (Step S2202). In addition, the transport vehicle receiver 404 acquires the no-loading vehicle total weight associated with the transport vehicle ID, from the vehicle weight storage unit 403 (Step S2203).

The vehicle weight transmitter 406 transmits the acquired allowable vehicle total weight and the no-loading vehicle total weight to the work vehicle 100 (Step S2204). The vehicle weight transmitter 406 according to another embodiment may calculate the loadable weight from the allowable vehicle total weight and the no-loading vehicle total weight, and may transmit the loadable weight to the work vehicle 100.

The vehicle weight receiver 1003 of the work vehicle 100 receives the allowable vehicle total weight of the transport vehicle T and the no-loading vehicle total weight, from the server device 400 (Step S2103). The vehicle weight receiver 1003 according to another embodiment may receive the loadable weight from the server device 400.

After that, the driver of the work vehicle 100 starts loading of the soil on transport vehicle T. The soil weight acquirer 1004 acquires the soil weight information from the payload meter 117 (Step S2104). The load weight calculator 1005 determines whether or the not soil is unloaded (Step S2105). For example, the load weight calculator 1005 determines that the soil is unloaded in a case where the soil weight information is changed from a state where the soil weight information is a predetermined threshold or more to a state where the soil weight information is less than the threshold. The soil unload determination method is not limited to this, and other methods may be adopted in other embodiments.

In a case where it is determined that the soil is unloaded (Step S2105: YES), the load weight calculator 1005 determines that the weight indicated by the soil weight information is the load weight of the soil to the transport vehicle T (Step S2106). The soil weight transmitter 1006 transmits the transport vehicle ID input to the transport vehicle input unit 1001 and the load weight information indicating the load weight calculated by the load weight calculator 1005 to the server device 400 (Step S2107).

In addition, the remaining load weight calculator 1007 calculates the remaining load weight of the transport vehicle T, according to the no-loading weight and the allowable vehicle total weight received by the vehicle weight receiver 1003, and the load weight calculated by the load weight calculator 1005 (Step S2108). For example, the remaining load weight calculator 1007 may calculate an initial value (loadable weight) of the remaining load weight by subtracting the no-loading weight from the allowable vehicle total weight, and may update the remaining load weight by subtracting the load weight from the remaining load weight each time the load weight is determined. In addition, for example, the remaining load weight calculator 1007 may calculate the remaining load weight by accumulating the load weight each time the load weight is determined and subtracting the no-loading weight and the accumulated load weight from the allowable vehicle total weight. Moreover, in a case where the vehicle weight receiver 1003 receives the loadable weight, the remaining load weight may be calculated according to the loadable weight. The output unit 1008 outputs an instruction to display the information on the remaining load weight calculated by the remaining load weight calculator 1007 to the input/output device 122 (Step S2109). Accordingly, the information on the remaining load weight of the transport vehicle T is displayed on the input/output device 122. More specifically, the progress bar i2 displayed on the input/output device 122 displays a ratio of a loaded weight to the initial value of the remaining load weight. The loaded weight is a value obtained by subtracting a current remaining load weight from the initial value of the remaining load weight or by accumulating the load weight calculated by the load weight calculator 1005. In addition, the current remaining load weight is displayed on the capacity label i3. Moreover, for example, in addition to these, the input/output device 122 according to another embodiment may display the loaded weight or the number of loading. The number of loading is equal to the number of times that it is determined that the soil is unloaded in Step S2105.

Meanwhile, the load weight receiver 407 of the server device 400 determines whether or not the transport vehicle ID and the load weight information from the work vehicle 100 are received from the work vehicle 100 (Step S2205). In a case where the transport vehicle ID and the load weight information from the work vehicle 100 are received from the work vehicle 100 (Step S2205: YES), the remaining load weight calculator 408 calculates the remaining load weight of the transport vehicle T, according to the allowable vehicle total weight and the no-loading vehicle total weight acquired by the vehicle weight acquirer 405, and the load weight information received by the load weight receiver 407 (Step S2206). Moreover, in a case where the vehicle weight receiver 1003 receives the loadable weight, the remaining load weight may be calculated according to the loadable weight. The method of calculating the remaining load weight by the remaining load weight calculator 408 is the same as that of the remaining load weight calculator 1007. In addition, the remaining load weight transmitter 409 transmits the calculated remaining load weight to the communication terminal 200 (Step S2207). For example, the remaining load weight transmitter 409 transmits the remaining load weight to the communication terminal 200 included in the transport vehicle T indicated by the transport vehicle ID received in Step S2205, the communication terminal 200 provided in another transport vehicle T operating at the same construction site as that of the transport vehicle T, or the communication terminal 200 operated by the manager of the construction site of the transport vehicle T. As a result, the information on the remaining load weight of the transport vehicle T is displayed on the communication terminal 200.

In a case where it is determined that the soil is not unloaded in Step S2105 (step S2105: NO) or in a case where the remaining load weight is displayed on the input/output device 122 in Step S2109, the control device 121 of the work vehicle 100 determines whether or not an input indicating the end of the loading processing is accepted via the input/output device 122 (Step S2110). For example, the control device 121 determines whether or not the recording button i4 of the input/output device 122 is pressed.

If the input indicating the end of the loading processing is not accepted (Step S2110: NO), the work vehicle 100 returns the processing to step S2104 and again acquires the soil weight information again. Meanwhile, in a case where the input indicating the end of the loading processing is accepted (Step S2110: YES), the work vehicle 100 transmits a loading end notification indicating the loading end to the server device 400 (Step S2111), and ends the processing.

In a case where the load weight information is not received in Step S2205 (step S2205: NO) or in a case where the remaining load weight is transmitted to the communication terminal 200 in Step S2207, the server device 400 determines whether or not the loading end notification is received from the work vehicle 100 (Step S2208). In a case where the loading end notification is not received from the work vehicle 100 (Step S2208: NO), the server device 400 returns the processing to Step S2205 and determines again whether or not the load weight information is received. Meanwhile, in a case where the loading end notification is received from the work vehicle 100 (Step S2208: YES), the server device 400 ends the processing.

<<Action and Effect>>

As described above, according to the first embodiment, the work vehicle 100 outputs the vehicle weight information on the loadable weight of the transport vehicle T and the remaining load weight of the transport vehicle T obtained from the load weight of the soil calculated according to the weight measured by the payload meter 117 to the input/output device 122. Accordingly, the driver of the work vehicle 100 can recognize the remaining load weight on the transport vehicle T during loading of the soil on the transport vehicle T. Therefore, according to the work vehicle 100 according to the first embodiment, it is possible to reduce a possibility that it takes a trouble of unloading the soil from the transport vehicle T due to overloading found after the soil is loaded on the transport vehicle T.

In addition, the server device 400 according to the first embodiment calculates the remaining load weight of the transport vehicle T from the vehicle weight information on the loadable weight of the transport vehicle T and the load weight of the soil calculated according to the weight measured by the payload meter 117. As a result, the server device 400 can calculate the remaining load weight on the transport vehicle T during the loading of the soil on the transport vehicle T by the work vehicle 100.

Moreover, the server device 400 according to the first embodiment transmits the calculated remaining load weight on the transport vehicle T to the communication terminal 200. In a case where the communication terminal 200 is provided in the transport vehicle T, after the driver of the transport vehicle T checks that the weight of the transport vehicle T operated by the driver is within the allowable vehicle total weight, the driver can transport the soil. In addition, in a case the communication terminal 200 is provided for another transport vehicle T, the driver of another transport vehicle T can easily estimate a timing when the transport vehicle T existing in the loading site leaves the loading site. In addition, in a case where the next transport vehicle T is waiting close to the loading site, the driver of the next transport vehicle T estimates a timing when the transport vehicle T which currently carries out the loading leaves and can prepare for the loading location. As a result, the load weight management system 1 can improve the efficiency of loading work.

Modification Example

In addition, according to the first embodiment, the work vehicle 100 includes the input/output device 122 which is the display device, and outputs the display instruction of the remaining load weight to the input/output device 122. As a result, the driver of the work vehicle 100 can visually recognize the remaining load weight. In addition, the work vehicle 100 according to another embodiment may output the remaining load weight to a device other than the display device. For example, the work vehicle 100 according to another embodiment may output the remaining load weight to a speaker or the communication terminal 200 provided in the work vehicle 100.

Moreover, the vehicle weight information according to the first embodiment includes the weight measured by the truck scale 300 when the transport vehicle T does not load the soil. Accordingly, the work vehicle 100 can accurately calculate the remaining load weight regardless of weight of an optional item of the transport vehicle T, weight of a fuel of the transport vehicle T, and weight of the driver of the transport vehicle T. In addition, the vehicle weight information according to another embodiment may not include the weight measured by the truck scale 300 when the transport vehicle T does not load the soil. For example, the vehicle weight information according to another embodiment may be stored in the vehicle weight storage unit 403 in advance by a manual input or the like of the driver of the transport vehicle T. The vehicle weight information input at this time preferably includes the weight of the optional item or the like carried by the transport vehicle T. In addition, the vehicle weight information according to the first embodiment is measured each time the transport vehicle T enters the loading site. However, the present invention is not limited to this. For example, the vehicle weight information according to another embodiment may be measured only when the transport vehicle T initially enters the loading site. In this case, the server device 400 generates the vehicle weight information by calculating the weight of the fuel consumed by the transport vehicle T according to a traveling route of the transport vehicle T or the like. In this case, the truck scale 300 transmits the measured vehicle weight information to the server device 400 at this time. Accordingly, the same transport vehicle T does not measure the weight by the truck scale 300 and does not input the transport vehicle ID to the truck scale 300 at the loading site from the next time on. Meanwhile, if the transport vehicle ID is input to or detected in the work vehicle 100 and the transport vehicle ID is transmitted to the server device 400, the server device 400 calculates the weight of the consumed fuel, updates the vehicle weight information associated with the transport vehicle ID, and transmits the vehicle weight information to the work vehicle 100. As a result, even if the number of measurements by the truck scale 300 is one, the server device 400 and the work vehicle 100 can calculate the remaining load weight. In addition, in a case where a fuel consumption amount is small enough to be negligible, the server device 400 may omit updating the vehicle weight information. Moreover, these calculations may not be performed by the server device 400 and may be performed by the truck scale 300 or the work vehicle 100.

In addition, the control device 121 according to the first embodiment receives the combination of the no-loading vehicle total weight of the transport vehicle T and the allowable vehicle total weight of the transport vehicle T from the server device 400 so as to calculate the remaining load weight. However, the present invention is not limited to this. For example, in another embodiment, the server device 400 may store, transmit, or receive the loadable weight which is a difference between the no-loading vehicle total weight and the allowable vehicle total weight, instead of the combination of the no-loading vehicle total weight of the transport vehicle T and the allowable vehicle total weight of the transport vehicle T. That is, the vehicle weight receiver 1003 may store, transmit and receive the loadable weight. In this case, the remaining load weight calculator 1007 calculates the remaining load weight of the transport vehicle T according to the received loadable weight. The output unit 1008 may display a progress ratio for the loadable weight. The progress bar i2 is an example of the progress ratio of the loading and the progress ratio of the loading is an example of information on the remaining loading capacity.

In addition, the work vehicle 100 according to the first embodiment calculates the remaining load weight according to the vehicle weight information and the load weight. However, the present invention is not limited to this. For example, the work vehicle 100 according to another embodiment may output the remaining load weight received from the server device 400 to the input/output device 122 without calculating the remaining load weight. That is, in another embodiment, the remaining load weight transmitter 409 may transmit information on the remaining load weight not only to the communication terminal 200 but also to the work vehicle 100. In addition, the server device 400 according to another embodiment may receive the remaining load weight from the work vehicle 100 without calculating the remaining load weight and notify the communication terminal 200 of the remaining load weight. That is, the remaining load weight may be calculated by at least one of the control device 121 and the server device 400 of the work vehicle 100.

In addition, the work vehicle 100 according to the first embodiment specifies the transport vehicle ID according to the input to the input/output device 122 by the driver. However, the present invention is not limited to this. That is, the transport vehicle specifier which specifies the transport vehicle T to be loaded with the soil is not limited to the transport vehicle input unit 1001. For example, the control device 121 of the work vehicle 100 according to another embodiment may specify the transport vehicle ID by receiving the signal including the transport vehicle ID from the communication terminal 200 provided in the transport vehicle T by a short-range wireless communication. Moreover, this transmission/reception relationship may be reversed. In addition, in the case where the work vehicle 100 according to another embodiment includes an imaging device, the transport vehicle ID displayed on the number plate or the like of the transport vehicle T may be imaged by the imaging device, and the transport vehicle ID may be extracted from the obtained image. Moreover, in the load weight management system 1 according to another embodiment, the work vehicle 100 and the transport vehicle T may respectively include the position detectors, and the transport vehicle ID may be specified according to the position detectors. Specifically, the work vehicle 100 may specify the transport vehicle ID of a neighboring transport vehicle T, according to position information of the work vehicle 100 and position information of the communication terminal 200 provided in the transport vehicle T.

In addition, the load weight management system 1 according to the first embodiment specifies the transport vehicle T to be loaded according to the transport vehicle ID. However, the present invention is not limited to this. For example, even when a construction is carried out using a plurality of transport vehicles T, in a case where only one transport vehicle T can exist at one loading site, the transport vehicle T whose weight is measured by the truck scale 300 may be specified to the transport vehicle T to be loaded without carrying out the input or the detection of the transport vehicle ID by the work vehicle 100.

Here, in a case where the allowable vehicle total weight can be specified from the no-loading vehicle total weight, the truck scale 300 does not accept the input of the transport vehicle ID but transmits only the no-loading vehicle total weight to the server device 400, and the server device 400 may calculate a loadable capacity from the no-loading vehicle total.

Moreover, in a case where the server device 400 stores the no-loading vehicle total weight at or the loadable capacity associated with the transport vehicle ID, the truck scale 300 does not need to measure the no-loading vehicle total weight. In this case, the load weight management system 1 may include the identification information acquisition device 302 instead of the truck scale 300. The identification information acquisition device 302 transmits the transport vehicle ID to the server device 400, and thus, can specify the loadable capacity of the transport vehicle T to be loaded.

Moreover, in another embodiment, each functional unit according to the first embodiment may be provided in any of the control device 121, the communication terminal 200, the truck scale 300, the server device 400, and other devices not shown in the first embodiment.

For example, in another embodiment, some or all of the processing performed by the server device 400 in the first embodiment may be performed by the truck scale 300. That is, the truck scale 300 according to another embodiment may function as the server device 400. In this case, the control device 121 of the work vehicle 100 may directly communicate with the truck scale 300.

In addition, for example, in another embodiment, some or all of the processing performed by the server device 400 in the first embodiment may be performed by the control device 121 of the work vehicle 100. For example, the control device 121 according to another embodiment may include the transport vehicle storage unit 401, the vehicle weight receiver 402, the vehicle weight storage unit 403, and the vehicle weight acquirer 405, instead of the vehicle weight receiver 1003.

In the first embodiment, the load weight management system 1 calculates or displays the remaining load weight of the transport vehicle T. However, the present invention is not limited to this. For example, the load weight management system 1 according to another embodiment may calculate and display the number of remaining loads by the work vehicle 100, instead of the remaining load weight. The number of the remaining loads can be obtained by dividing the remaining load weight by the load weight when is loaded once by the work vehicle 100. For example, the load weight when is loaded once may be a value input in advance, or may be a value measured in advance using the load weight calculator 1005, or may be a value calculated from an average value of the past loading history or the like. The remaining load weight and the number of the remaining loads are examples of information on the remaining loading capacity.

In addition, the load weight management system 1 according to still another embodiment may output a predetermined remaining load weight or the number of the remaining loads or may output a display indicating that the loading reaches an ideal loading capacity at a time when reaches the progress ratio of the loading, instead of the remaining load weight. For example, the ideal loading capacity indicates a state within a range of 90% to 100% in the progress ratio of the loading.

Moreover, the load weight management system 1 according to still another embodiment may output a display promoting an adjustment of the loading amount due to overloading occurring if the loading is applied by a bucket maximum capacity at the time of the next loading at a time when the loading reaches the predetermined remaining load weight, the number of the remaining loads, or the progress ratio of the loading, instead of the remaining load weight. For example, the loading capacity for which the loading amount is to be adjusted indicates a state within a range of 80% to 90% in the progress ratio of the loading.

Moreover, the load weight management system 1 according to still another embodiment may output a display indicating that the loading reaches an overload state at the time when the loading reaches the predetermined remaining load weight, the number of the remaining loads, or the progress ratio of the loading, instead of the remaining load weight. For example, the loading capacity in the overload state indicates a state where the loading is larger than 100% in the progress ratio of the loading.

The ideal loading capacity, the loading capacity for which the loading amount is to be adjusted, and the loading capacity in the overload state may be output by lighting of a lamp, a buzzer sound, or the like.

The ideal loading capacity, the loading capacity for which the loading amount is to be adjusted, and the loading capacity in the overload state are examples of the information on the remaining loading capacity.

<Configuration of Computer>

Figure 8:
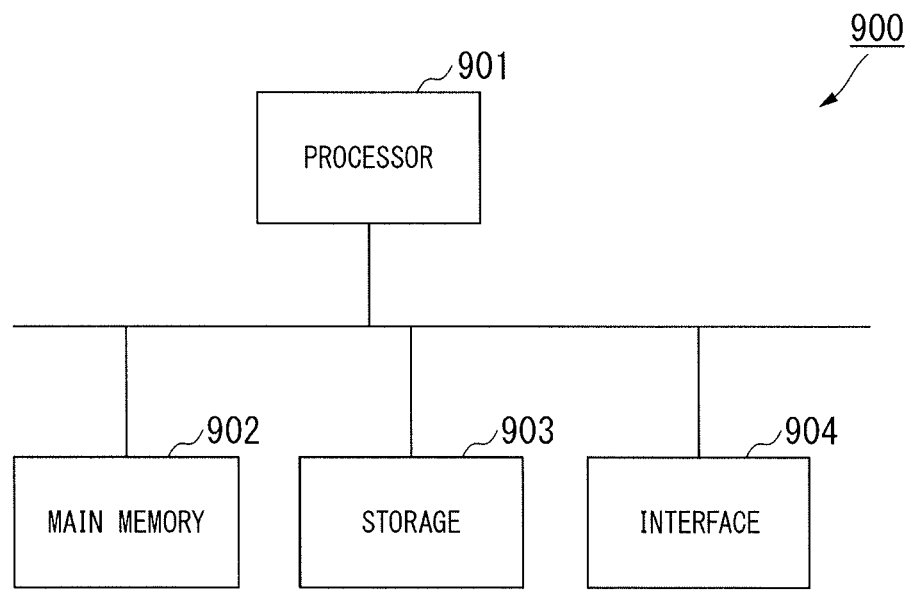
FIG. 8 is a schematic block diagram showing a configuration of a computer according to at least one embodiment.

FIG. 8 is a schematic block diagram showing a configuration of a computer according to at least one embodiment.

A computer 900 includes a processor 901, a main memory 902, a storage 903, and an interface 904.

The control device 121 and the server device 400 according to the above-described embodiment each include the computer 900. The functions of the above-described respective processing units are stored in the storage 903 as a program. The processor 901 reads the program from the storage 903, develops the program in the main memory 902, and executes the above-described processing according to the program. In accordance with the program, the processor 901 secures a storage area corresponding to each storage unit described above in the main memory 902.

An example of the storage 903 includes a Hard Disk Drive (HDD), a Solid State Drive (SSD), a magnetic disk, a magneto-optical disk, a Compact Disc Read Only Memory (CD-ROM), a Digital Versatile Disc Read Only Memory (DVD-ROM), a semiconductor memory, or the like. The storage 903 may be an internal medium directly connected to a bus of the computer 900 or may be an external medium connected to the computer 900 via the interface 904 or a communication line. In addition, in a case where this program is delivered to the computer 900 via a communication line, the distributed computer 900 may develop the program in the main memory 902 and execute the above process. In at least one embodiment, the storage 903 is a non-transitory tangible storage medium.

The program may realize a portion of the above-described functions. For example, the program may realize the above-described function in combination with another program already stored in the storage 903, or in combination with another program installed in another apparatus.

In addition to or instead of the above configuration, the computer 900 may include a programmable logic device (PLD). An example of the PLD includes Programmable Array Logic (PAL), Generic Array Logic (GAL), Complex Programmable Logic Device (CPLD), and Field Programmable Gate Array (FPGA).

INDUSTRIAL APPLICABILITY

According to the above-described aspect, it is possible to recognize information on a remaining loading capacity when loading is performed on a transport vehicle such as a dump truck.

REFERENCE SIGNS LIST

1: load weight management system
100: work vehicle
121: control device
1001: transport vehicle input unit
1002: transport vehicle notifier
1003: vehicle weight receiver
1004: soil weight acquirer
1005: load weight calculator
1006: soil weight transmitter
1007: remaining load weight calculator
1008: output unit
200: communication terminal
300: truck scale
400: server device
401: transport vehicle storage unit
402: vehicle weight receiver
403: vehicle weight storage unit
404: transport vehicle receiver
405: vehicle weight acquirer
406: vehicle weight transmitter
407: load weight receiver
408: remaining load weight calculator
409: remaining load weight transmitter

What is claimed is:

1. A work vehicle comprising:
a working device which is configured to excavate and unload soil;
a load meter which is configured to measure weight of the soil loaded by the working device;
a transport vehicle specifier which is configured to specify a transport vehicle to be loaded with the soil;
a vehicle weight acquirer which is configured to acquire allowable vehicle total weight of the transport vehicle and no-loading vehicle total weight of the transport vehicle; and
an output unit which is configured to output information on a remaining loading capacity of the transport vehicle, according to the allowable vehicle total weight, the no-loading vehicle total weight, and the weight measured by the load meter.

2. The work vehicle according to claim 1, further comprising:
a display device,
wherein the output unit is configured to output display instructions of the information on the remaining loading capacity and identification information of the transport vehicle to the display device.

3. The work vehicle according to claim 2, further comprising:
a weight transmitter which is configured to transmit weight information indicating the weight measured by the load meter to an outside.

4. The work vehicle according to claim 3,
wherein the information on the remaining loading capacity includes remaining load weight of the transport vehicle.

5. The work vehicle according to claim 4, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

6. The work vehicle according to claim 3, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

7. The work vehicle according to claim 2,
wherein the information on the remaining loading capacity includes remaining load weight of the transport vehicle.

8. The work vehicle according to claim 7, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

9. The work vehicle according to claim 2, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

10. The work vehicle according to claim 1, further comprising:
a weight transmitter which is configured to transmit weight information indicating the weight measured by the load meter to an outside.

11. The work vehicle according to claim 10,
wherein the information on the remaining loading capacity includes remaining load weight of the transport vehicle.

12. The work vehicle according to claim 11, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

13. The work vehicle according to claim 10, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

14. The work vehicle according to claim 1,
wherein the information on the remaining loading capacity includes remaining load weight of the transport vehicle.

15. The work vehicle according to claim 14, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

16. The work vehicle according to claim 1, further comprising:
a storage unit which is configured to store the acquired allowable vehicle total weight of the transport vehicle and the acquired no-loading vehicle total weight of the transport vehicle,
wherein the output unit is configured to output the information on the remaining loading capacity of the transport vehicle according to the stored allowable vehicle total weight of the transport vehicle and the stored no-loading vehicle total weight of the transport vehicle.

17. A server device comprising:
a transport vehicle specifier, being a receiver configured to receive information from a work vehicle, which is configured to specify a transport vehicle to be loaded with soil by the work vehicle among a plurality of the transport vehicles;
a storage unit, being a tangible storage medium, which is configured to store allowable vehicle total weight of each of the plurality of transport vehicles;
a vehicle weight acquirer, being a receiver configured to receive information from the transport vehicle, which is configured to acquire no-loading vehicle total weight of the transport vehicle;
a load weight acquirer, being the receiver configured to receive information from the work vehicle, which is configured to acquire load weight of the soil loaded on the transport vehicle by the work vehicle; and
an output unit, being a transmitter configured to transmit information to the work vehicle and the transport vehicle, which is configured to output information on a remaining loading capacity of the transport vehicle, according to the allowable vehicle total weight related to the transport vehicle stored in the storage unit, the acquired no-loading vehicle total weight, and the load weight.

18. A load weight management system comprising:
a work vehicle which includes a working device which is configured to excavate and unload soil and a load meter which is configured to measure weight of the soil loaded by the working device;
a transport vehicle specifier which is configured to specify a transport vehicle to be loaded with the soil by the work vehicle among a plurality of the transport vehicles;
a storage unit which is configured to store allowable vehicle total weight of each of the plurality of transport vehicles and no-loading vehicle total weight of each of the plurality of transport vehicles; and
an output unit which is configured to output information on a remaining loading capacity of the transport vehicle, according to the allowable vehicle total weight related to the transport vehicle stored in the storage unit, the no-loading vehicle total weight related to the transport vehicle stored in the storage unit, and the load weight.

19. The load weight management system according to claim 18, further comprising:
a vehicle weight meter which is provided in a construction site and is configured to measure weight of the transport vehicle,
wherein the vehicle weight meter is configured to measure the no-loading vehicle total weight of the transport vehicle, and
wherein the storage unit is configured to store the no-loading vehicle total weight of the transport vehicle measured by the vehicle weight meter.

20. A load weight management method comprising:
providing a vehicle weight meter which is provided in a construction site and is configured to measure weight of a transport vehicle and a no-loading vehicle total weight of the transport vehicle,
measuring weight of soil loaded by a work vehicle;
specifying the transport vehicle to be loaded with the soil by the work vehicle;
acquiring allowable vehicle total weight of the transport vehicle and no-loading vehicle total weight of the transport vehicle; and
an output unit which is configured to output information on a remaining loading capacity of the transport vehicle obtained from the allowable vehicle total weight, the no-loading vehicle total weight, and the weight of the soil loaded by the work vehicle.

* * * * *